United States Patent
Hofmann et al.

(10) Patent No.: US 10,330,566 B2
(45) Date of Patent: Jun. 25, 2019

(54) METHODS AND APPARATUS FOR SMALL APERTURE LENSOMETER

(71) Applicant: EyeNetra, Inc., Cambridge, MA (US)

(72) Inventors: Matthias Hofmann, Wayland, MA (US); Vitor Pamplona, Somerville, MA (US); Nathaniel Sharpe, Cambridge, MA (US); Monica Mitiko Soares Matsumoto, Somerville, MA (US); Guilherme de Moraes Uzejka, Boston, MA (US); Meng Yang, Leominster, MA (US)

(73) Assignee: EYENETRA, INC., Cambridge, MA (US)

( * ) Notice: Subject to any disclaimer, the term of this patent is extended or adjusted under 35 U.S.C. 154(b) by 0 days.

(21) Appl. No.: 15/552,288

(22) PCT Filed: Mar. 4, 2016

(86) PCT No.: PCT/US2016/020991
§ 371 (c)(1),
(2) Date: Aug. 20, 2017

(87) PCT Pub. No.: WO2016/141333
PCT Pub. Date: Sep. 9, 2016

(65) Prior Publication Data
US 2018/0038768 A1    Feb. 8, 2018

Related U.S. Application Data

(60) Provisional application No. 62/128,995, filed on Mar. 5, 2015.

(51) Int. Cl.
*G01M 11/02* (2006.01)

(52) U.S. Cl.
CPC .... G01M 11/0228 (2013.01); G01M 11/0264 (2013.01)

(58) Field of Classification Search
CPC ......... G01M 11/0228; G01M 11/0264; G01M 11/0235
USPC ............................... 356/124, 126–7
See application file for complete search history.

(56) References Cited

U.S. PATENT DOCUMENTS

| | | | |
|---|---|---|---|
| 4,275,964 A * | 6/1981 | Vassiliadis | G01M 11/0235 356/125 |
| 4,281,926 A * | 8/1981 | Cornsweet | G01M 11/0235 250/236 |
| 4,534,645 A | 8/1985 | Nohda | |
| 4,730,924 A | 3/1988 | Allard et al. | |
| 5,294,971 A | 3/1994 | Braunecker et al. | |
| 6,145,989 A | 11/2000 | Ikezawa et al. | |
| 6,515,739 B2 | 2/2003 | Volkenandt et al. | |
| 6,657,710 B2 | 12/2003 | Kajino et al. | |
| 7,230,693 B2 | 6/2007 | Imaizumi | |
| 7,486,389 B2 | 2/2009 | Imaizumi | |

(Continued)

*Primary Examiner* — Isiaka O Akanbi
(74) *Attorney, Agent, or Firm* — Stephen R. Otis

(57) ABSTRACT

In illustrative implementations of this invention, a lensometer includes a small aperture camera for capturing an image of light that travels from a display surface, through a subject lens and to the camera. One or more computers are programmed to perform calculations that take the image as an input and that compute, for each respective region in a set of regions of the subject lens, a refractive attribute of the respective region.

18 Claims, 6 Drawing Sheets

(56) References Cited

U.S. PATENT DOCUMENTS

| | | | |
|---|---|---|---|
| 7,733,468 B2 | 6/2010 | Kajino | |
| 2001/0055111 A1* | 12/2001 | Yoda | G01M 11/0207 356/127 |
| 2002/0071111 A1 | 6/2002 | Epstein | |
| 2002/0154292 A1* | 10/2002 | Fukuma | G01M 11/0228 356/127 |
| 2003/0015649 A1 | 1/2003 | Levecq et al. | |
| 2003/0043367 A1* | 3/2003 | Kajino | G01M 11/0235 356/124 |
| 2004/0207834 A1* | 10/2004 | Suzuki | G01M 11/0228 356/124 |
| 2005/0237513 A1* | 10/2005 | Hayashi | G01M 11/0228 356/124 |
| 2005/0237514 A1* | 10/2005 | Kobayashi | G01M 11/0221 356/124 |
| 2008/0180635 A1 | 7/2008 | Warden et al. | |
| 2008/0297776 A1* | 12/2008 | Mizuno | B24B 13/0012 356/125 |
| 2012/0224142 A1* | 9/2012 | Cornsweet | A61B 3/12 351/206 |
| 2015/0286038 A1* | 10/2015 | Finegold | B05D 1/28 427/164 |

* cited by examiner

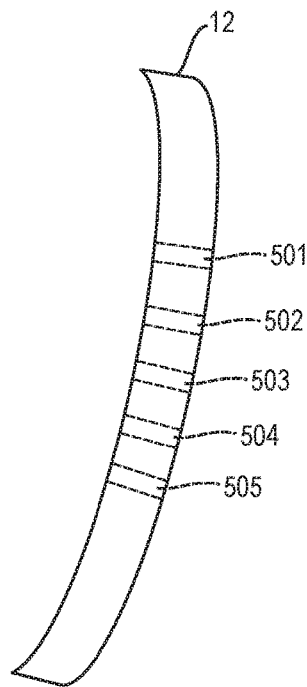

FIG. 5

| A CAMERA CAPTURES A FIRST IMAGE OF LIGHT, WHICH LIGHT LEAVES A DISPLAY SURFACE AND TRAVELS THROUGH A SUBJECT LENS BEFORE REACHING THE CAMERA. THE FIRST IMAGE IS AN IMAGE OF A SET OF VISUAL FEATURES DISPLAYED AT THE DISPLAY SURFACE. THE CAMERA INCLUDES A SENSOR FOR MEASURING INTENSITY OF LIGHT AND ALSO INCLUDES A LENS SYSTEM. THE APERTURE OF THE CAMERA IS SMALL AND FIXED. THE APERTURE AND THE LENS SYSTEM ARE EACH LOCATED BETWEEN THE SUBJECT LENS AND THE SENSOR. | 601 |

↓

| ONE OR MORE COMPUTERS PERFORM CALCULATIONS TO COMPUTE, FOR EACH RESPECTIVE REGION IN A SET OF MULTIPLE REGIONS OF THE SUBJECT LENS, A REFRACTIVE ATTRIBUTE OF THE RESPECTIVE REGION. THE CALCULATIONS INCLUDE (I) DATA DERIVED FROM THE FIRST IMAGE AND (II) DATA DERIVED FROM A SECOND IMAGE CAPTURED WITH THE SUBJECT LENS ABSENT. FOR EXAMPLE, IN SOME CASES, ONE OR MORE COMPUTERS COMPARE DATA FROM THE FIRST IMAGE AND THE SECOND IMAGE BY: (I) IDENTIFYING A PAIR OF VISUAL FEATURES; (II) DETECTING CHANGE IN DISTANCE BETWEEN THE VISUAL FEATURES IN THE PAIR; AND (III) DETECTING CHANGE IN ORIENTATION OF A LINE THAT INTERSECTS THE VISUAL FEATURES IN THE PAIR. IN OTHER CASES, ONE OR MORE COMPUTERS COMPARE DATA FROM THE FIRST IMAGE AND THE SECOND IMAGE: (I) BY COMPUTING AN ELLIPTICAL RATIO; OR (II) BY COMPARING A FUNCTION THAT IS FITTED TO POINTS IN THE FIRST IMAGE AND A FUNCTION THAT IS FITTED TO POINTS THE SECOND IMAGE. | 602 |

FIG. 6

METHODS AND APPARATUS FOR SMALL APERTURE LENSOMETER

RELATED APPLICATIONS

This application is a non-provisional of, and claims the priority of, U.S. Provisional Patent Application No. 62/128,995, filed Mar. 5, 2015.

FIELD OF TECHNOLOGY

In illustrative implementations, this invention relates generally to small aperture lensometers.

SUMMARY

In illustrative implementations, a compact housing is releasably attached to a mobile computing device (MCD), such as smartphone or a web-cam. Together, the MCD and attached housing comprise a lensometer.

A camera in the MCD functions as the camera for the lensometer. The housing, which is releasably attached to the MCD, includes a lens rest. The lens rest holds a lens that is being measured by the lensometer (a "subject lens").

The lensometer (formed by the MCD and housing) is inexpensive, accurate, and lightweight. The lensometer measures one or more refractive attributes (e.g. spherical power, cylindrical power, cylindrical axis, prism or base) of a subject lens (i.e., lens being tested) at each of multiple regions of the subject lens. These regions ("probe regions") are distributed over a large area of the subject lens. The lensometer takes these measurements at different probe regions of the subject lens simultaneously. The measurement at each probe region is independent of the measurement at the other probe regions.

In many implementations, the MCD comprises a smartphone, tablet computer, or web-cam.

In many use scenarios, the subject lens (lens being measured) comprises a lens in a pair of eyeglasses, a lens in a pair of sunglasses, a lens blank, or an optical element such as a prism.

The lensometer (formed by the MCD and attached housing) includes a display surface. Light from the display surface passes through the subject lens and then travels to the camera. The subject lens bends light that passes through it, causing visual features of the display surface (as they appear in an image captured by the camera) to be deformed or translated, as compared to how these visual features would appear if the subject lens is removed. A computer analyzes this deformation or translation to determine a value of at least one refractive attribute for each respective probe region (out of a set of multiple probe regions in the subject lens).

In some cases, a display surface displays a static visual pattern. For example, in some cases, a static visual pattern is printed on the display surface.

In other cases, a display surface displays a temporally varying visual pattern. For example, in some cases, the display surface is a liquid crystal display or other electronic visual display that displays a temporal sequence of images.

In some cases, the display surface is a component of the housing, and the subject lens is disposed between the camera and the display surface. In these cases: (a) the camera and display surface are on opposite sides of the subject lens, (b) a straight line that is co-located with the optical axis of the camera intersects both the subject lens and the display surface; and (c) light passes through the subject lens only once, while traveling from the display surface to the camera.

In other cases, one or more mirrors fold the optical path. Advantageously, a folded optical path tends to allow the lensometer to be implemented in a smaller form factor. For example, in some alternative cases: (a) both the camera and display surface are on the same side of the subject lens; (b) light travels from the display surface through the subject lens a first time, then travels to a mirror, then reflects off of the mirror, then travels from the mirror through the subject lens a second time, then travels to the camera. Thus, in these cases, light travels through the subject lens twice, while traveling from the display surface to the camera.

In some cases in which a mirror is used: (a) both the display surface and camera are onboard the same MCD (e.g., smartphone); and (b) the display surface comprises all or part of an electronic visual display screen of the MCD.

In illustrative implementations, the diameter of the aperture of the camera is much smaller than the diameter of the subject lens. As used herein, a first number is "much smaller" than a second number if the ratio of the first number to the second number is less than 0.1.

Furthermore, in illustrative implementations, the diameter of the entrance opening of the camera is greater than or equal to the maximum dimension of each respective probe region on the subject lens.

In illustrative implementations, the camera of the MCD—and thus the camera of the lensometer—has an aperture that is both small (less than or equal to 8 mm in diameter) and fixed. Likewise, in illustrative implementations, the camera of the MCD—and thus the camera of the lensometer—has an entrance opening that is both small (less than or equal to 8 mm in diameter) and fixed.

In some alternative cases, the lensometer measures non-refractive optical properties (e.g., diffraction or diffusion) or measures optical properties of an optical element other than a lens (e.g., a diffractive optical element or an optical element with semi-opaque or varying diffusive optical properties).

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section and Field of Endeavor section are not limiting; instead they identify, in a general, non-exclusive manner, a field of technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

In FIGS. 4A and 4C, the image is captured with the subject lens absent, and thus visual features of the image are not distorted by the subject lens. In FIGS. 4B and 4D, the image is captured with the subject lens present, and thus visual features of the image are distorted by the subject lens.

FIG. 5 shows multiple probe regions of a subject lens.

FIG. 6 describes steps in a method of measuring refractive attributes of multiple probe regions in a subject lens.

The above Figures show some illustrative implementations of this invention, or provide information that relates to those implementations. However, this invention may be implemented in many other ways.

DETAILED DESCRIPTION

In illustrative implementations of this invention, a lensometer measures one or more refractive attributes of a lens at many regions (probe regions) simultaneously. The measurement of each probe region is independent of the measurement of other probe regions.

The refractive attributes that are measured by the lensometer include one or more of spherical power, cylindrical power, axis, prism or base.

In illustrative implementations, numerous probe regions are distributed over a large area ("testing area") of the lens being tested ("subject lens"). For example, in some implementations: (a) the testing area is 30 mm×45 mm; (b) the testing area includes 950 probe regions; (c) the probe regions are each 1.18 mm in diameter, and (c) the probe regions are arranged in a 25×38 rectangular grid pattern.

In illustrative implementations, the large testing area (within which the numerous probe regions are arranged) is part of the total area of the subject.

Figure 1:
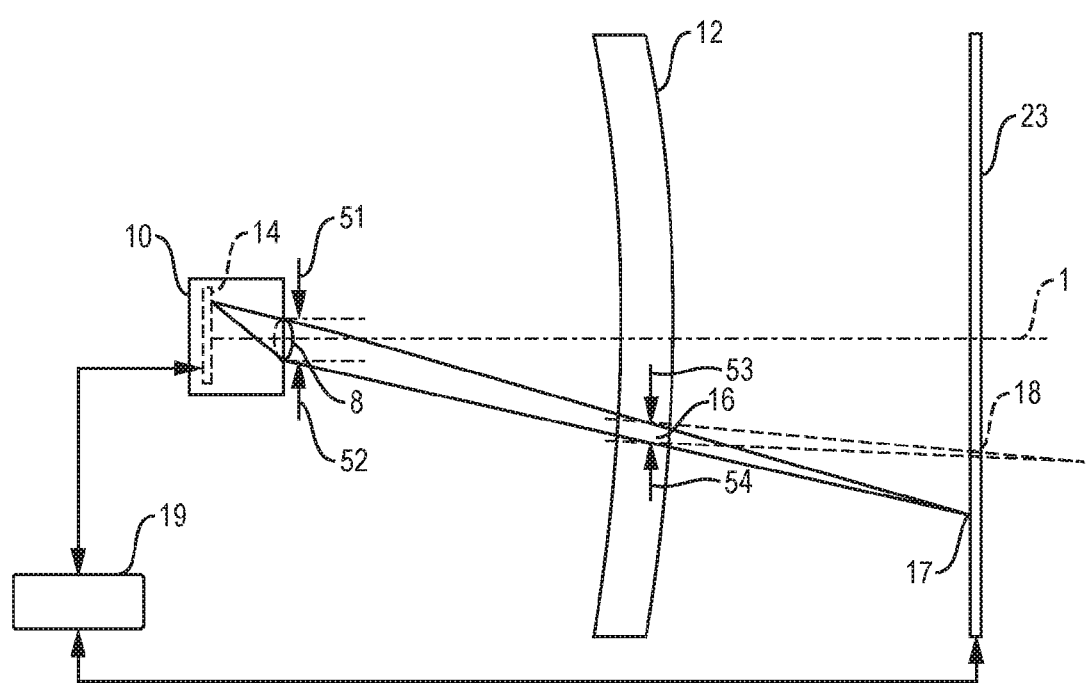
FIG. 1 shows a lensometer that measures refractive attributes of a subject lens.

FIG. 1 shows an illustrative embodiment of this invention. In the example shown in FIG. 1, the lensometer includes a camera 10, lens rest (not shown), and display surface 23. The lens rest supports the subject lens 12 being measured. The camera 10 includes an imaging sensor 14 and a lens 8.

Figure 2:
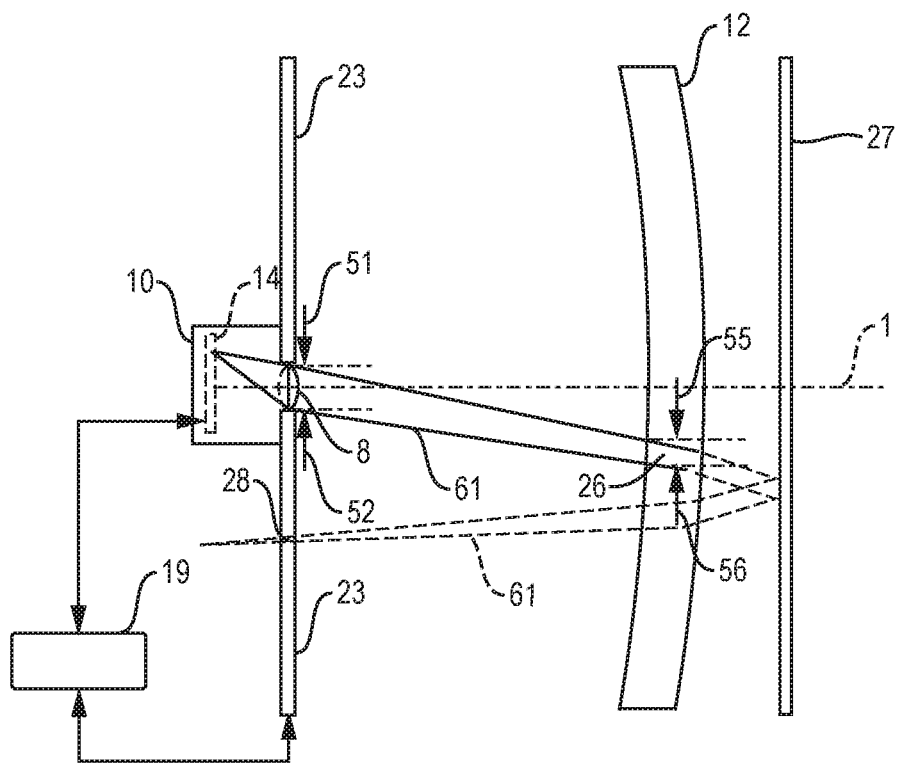
FIG. 2 shows a lensometer that includes a mirror and has a folded optical path, such that light from a display surface travels through a subject lens twice before reaching a camera.
Figure 3:
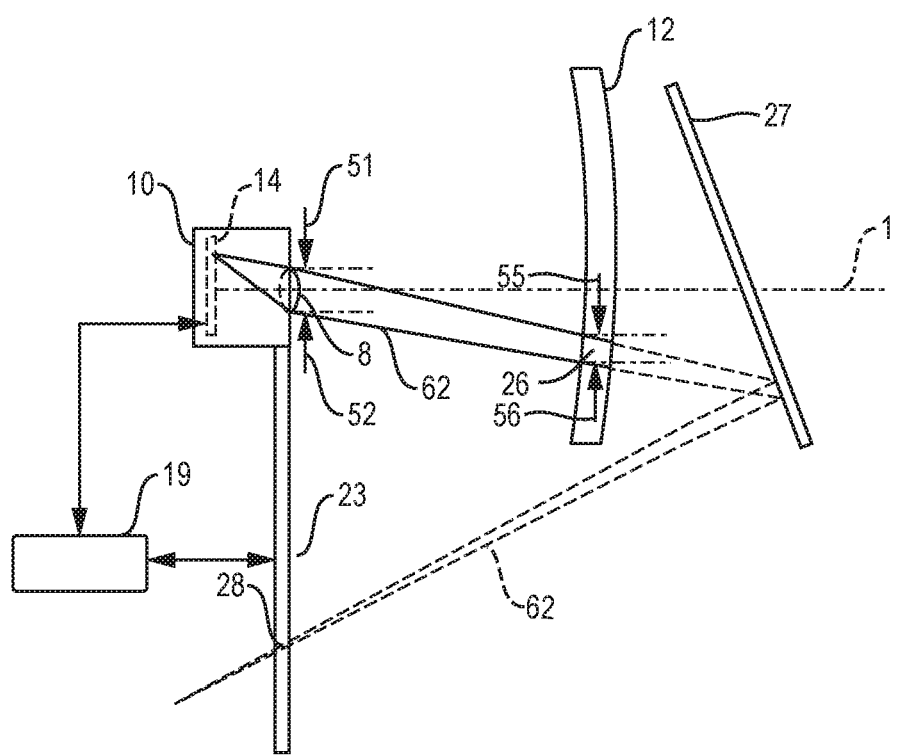
FIG. 3 shows a lensometer that includes a mirror and has a folded optical path, such that light from a display surface travels through a subject lens only once before reaching a camera.

In the examples shown in FIGS. 1, 2 and 3: (a) the aperture of the camera and the entrance opening of the camera are located at the same place as lens 8; and (b) the aperture of the camera is small: i.e., less than or equal to 8 mm. In the examples shown in FIGS. 1, 2, and 3, the aperture is fixed and the diameter of the aperture is equal to the distance between the tips of arrows 51 and 52.

However, the camera's aperture is not always at the entrance opening of the camera. In some cases, the aperture is located inside the camera behind the entrance opening of the camera. For example, the aperture may be located at an internal diaphragm, stop or lens of the camera, such as a lens in a compound lens or lens system that is inside the camera. In some cases, the aperture is a pinhole. Regardless of where the aperture of the camera is located, the diameter of the aperture may be less than or equal to 8 mm.

For example, in some cases, lens 8: (a) is a single lens; and (b) is located at the aperture and entrance opening of the camera.

In FIG. 1, the subject lens 12 is positioned between a display surface 23 and the camera 10. The subject lens 12 is supported by, and held in position by, a lens rest (not shown).

In FIGS. 1, 2 and 3, the display surface 23 displays a pattern of visual features, such as a pattern of circular dots, or squares, or stars. In some cases, the display surface 23 is flat; in other cases, the display surface 23 is curved.

In some cases, the display surface 23 displays a static pattern of visual features—i.e., a pattern that is temporally constant. For example, in some cases the visual pattern is printed on the display surface (e.g., printed on a layer that is attached by adhesive to the rest of the display surface).

In illustrative implementations, the subject lens distorts the apparent size and shape of visual features of the display surface, and shifts the apparent position of these visual features. A computer utilizes this distortion or shift (or both) in order to determine refractive attributes of the subject lens.

In some cases, the subject lens distorts the apparent size or shape of visual features of display surface 23 (as seen from imaging sensor 14), as compared to the size or shape of these visual features in the absence of the subject lens (as seen from imaging sensor 14). In some cases, a computer 19 analyzes data captured by the imaging sensor 14 to compute this distortion, for each probe region respectively. Based on this computed distortion, the computer 19 calculates refractive attributes for each probe region respectively.

In some cases, the subject lens 12 also shifts the apparent position of visual features of display surface 23 (as seen from imaging sensor 14), as compared to the position of these visual features in the absence of the subject lens (as seen from imaging sensor 14). In some cases, a computer (e.g., computer 19) analyzes data captured by the imaging sensor 14 to compute this shift (translation), for each probe region respectively. Based on this computed shift, the computer calculates refractive attributes for each probe region respectively.

In illustrative implementations of this invention, the lensometer measures refractive attributes (or other optical properties) of the subject lens 12 at numerous probe regions simultaneously. The probe regions are distributed throughout a large testing area of subject lens 12.

FIG. 1 shows an example of a probe region. The diameter of probe region 16 is equal to the distance between the tips of arrows 53 and 54. In the example shown in FIG. 1, the diameter of the entrance opening of camera 10 is greater than or equal to the diameter of each probe region of subject lens 12, including probe region 16. (Recall that, in FIG. 1, the entrance opening of the camera is coincident with the position of lens 8.)

When the subject lens 12 is absent, light travels though probe region 16 without being bent. For example, light exits from point 17 on the display surface 23, travels through probe region 16, and then travels to the camera 10.

When the subject lens is present, light is refracted as it passes through the subject lens along a path that intersects probe region 16. For example, when subject lens 12 is present (e.g., positioned on the lens rest), then: (a) the subject lens 12 refracts light from the display surface 23, and (b) light from a blurred region 18 of the display surface 23 passes through probe region 16 and then travels to camera 10. As used herein, a "blurred region" means a region that appears blurry (unfocused) in an image captured by a camera.

In illustrative implementations, the camera 10 and computer 19 are both housed in a single mobile computing device (MCD), such as a smartphone. In some cases, the MCD comprises a web-cam and a computer that is linked to the web-cam by a wired or wireless communication link (e.g., a USB cable). In some cases (e.g., in some web-cams), at least some computational tasks (e.g. one or more of the analysis of data captured by the camera, calculation of distortion or shift, and computation of refractive attributes)

are performed by one or more additional computers (not shown). In some cases, at least some of these additional computers are remote from the MCD.

In some implementations, the display surface 23 is illuminated by one or more light sources that are separate from the display surface. For example, in some cases: (a) the camera 10 is housed in an MCD (e.g., a smartphone or webcam); (b) a display screen (or other light source, such as an LED) onboard the MCD diffusely illuminates the display surface 23, and (c) the display surface 23 reflects this light.

Alternatively, in some cases, the display surface includes a plurality of active light sources, and the arrangement of these active light sources comprises a visual pattern displayed by the display surface. For example, in some cases, the display surface 23 comprises light-emitting-diodes (LEDs) or organic light-emitting-diodes OLEDs).

In some cases, the optical axis 1 of the camera 10 is centered on an optical axis of the subject lens 12. However, this is not always the case. In some use scenarios, optical axes of the lensometer camera and subject lens are not aligned with each other.

In illustrative implementations, any type of digital imaging technology is used for the imaging sensor 14. For example, in some cases, imaging sensor 14 comprises a CCD (charge-coupled device) or a CMOS (complementary metal-oxide-semiconductor) device, or an active-pixel device. In illustrative implementations, imaging sensor 14 measures light intensity incident at different points or regions (e.g., pixels) of the imaging sensor 14. In some cases: (a) imaging sensor 14 measures a spatial distribution of light intensity that is incident on the imaging sensor; and (b) imaging sensor 14 is a distributed light detector. The imaging sensor 14 is either flat or curved.

Small Aperture Lensometer

In illustrative implementations, the lensometer is a small aperture lensometer. The lensometer includes a small aperture camera. The small aperture camera captures images of light that has passed through a subject lens (or other optical element) being measured.

Using a lensometer that includes a small aperture camera is advantageous for at least three reasons. First, a small aperture reduces the size of a probe region (as discussed below with respect to Equations 1 and 2). The smaller the probe region, the more probe regions fit into a testing area of a subject lens, and the greater the spatial resolution of the lensometer. A higher spatial resolution of the lensometer is desirable. Third, many conventional MCDs (e.g., smartphones, tablets and webcams) have a small aperture camera. A lensometer design that uses a small aperture camera may employ the small aperture camera of the MCD (e.g., smartphone or webcam) as the lensometer camera.

According to principles of this invention, in many implementations, using a small aperture camera reduces the size of the probe region (as compared to the size of the probe region in a larger aperture camera). The following discussion of Equations 1 and 2 sheds light on this inventive principle.

The inventors observed that, if camera 10 is focused at a distance further from the camera than the subject lens 12, then the diameter D of a probe region is:

$$D \leq (EO \times (1 - s/d)) + \left(\frac{dp}{fs} \times s\right) d > s \quad \text{Eq. 1}$$

where D is the diameter of the probe region, EO is the diameter of the entrance opening of the camera, d is the distance at which the camera is focused, s is the distance between the entrance opening (of the camera) and the subject lens, fs is the focal length of the camera, and dp is the width of a pixel of the camera (i.e., the distance from the beginning of a pixel to the beginning of an adjacent pixel). The term $$\frac{dp}{fs}$$

is a measure of angular ambiguity of light rays measured by a pixel.

In typical implementations of this invention, the term $$\left(\frac{dp}{fs} \times s\right)$$

is negligible. For example, in some cases, the focal length $fs=5.2$ mm, and the pixel width $dp=2\times10^{-3}$ mm, and $s\leq100$ mm (s being the distance at which the camera is focused), and $$\left(\frac{dp}{fs} \times s\right) \leq 3.84 \times 10^{-3} \text{ mm.}$$

Thus, in typical implementations of this invention, the term $$\left(\frac{dp}{fs} \times s\right)$$

is ignored, and the formula for the diameter D of a probe region reduces to:

$$D \leq EO \times (1 - s/d) d > s \quad \text{Eq 0.2}$$

The maximum size of the probe region occurs when the camera is focused at infinity. If the camera is focused at infinity, then $d=\infty$, and thus $s/d=0$, and thus (per Equation 2) $D=EO$. Therefore, when the camera is focused at infinity, the diameter of the probe region is equal to the entrance opening of the camera.

However, in many implementations of this invention, the camera is not focused at infinity, and the diameter of the probe region is substantially smaller than the entrance opening of the camera according to Equation 2. This is advantageous for probing the subject lens at high spatial resolutions.

In some cases, the camera 10 is focused at the display surface 23, and the subject lens is positioned half way between the camera 10 and the display surface 23. That is, in some cases, $d=2s$, where d is the distance at which the camera is focused, and s is the distance between subject lens and the entrance opening of the camera. In those cases, $d=2s$, and thus $1-s/d=0.5$ and thus $D \leq 0.5 \times EO$, per Equation 2. Therefore, when the subject lens is positioned half-way between the camera and the display surface (and the camera is focused on the display surface), the probe diameter is equal to or less than one half of the entrance opening of the camera.

Positioning the display surface and subject lens in this way (where the subject lens is half way in between the display surface and camera) maximizes the refractive effect of the subject lens (as seen from imaging sensor 14).

In some cases, the optical path is folded by one or more mirrors, as discussed in more detail below. If the optical path is folded, then to say that the subject lens is half-way between the display surface and the camera means that the optical distance between the camera and the display surface is equal to half the optical distance between the camera and the display surface.

Moving the subject lens away from the half-way point reduces the refractive effect of the subject lens. For example, if the subject lens is positioned further from the camera and very close to the display surface, then the refractive effect of the subject lens (as seen from imaging sensor 14) is reduced to almost zero. Likewise, if the subject lens is positioned very close to the camera and further away from the display surface, then the refractive effect of the subject lens (as seen from imaging sensor 14) is reduced to almost zero.

Positioning the subject lens very close to the display surface (while focusing the camera on the display surface) would cause s/d to approach 1, and would thus cause 1−s/d to approach zero, and would thus dramatically reduce the diameter D of the probe region, per Equation 2. However, doing so would also sharply reduce the refractive effect of the subject lens (as discussed in the preceding paragraph), and thus lead to an unworkably high signal-to-noise ratio (SNR).

In many implementations: (a) camera 10 is onboard a mobile computing device (e.g., a smartphone or web-cam); (b) camera 10 is focused on the display surface 23; and (c) the subject lens is positioned half way between the display surface and entrance opening of the camera. The configuration described in the preceding sentence has at least two advantages: (1) the refractive effect of the subject lens is maximized; and (2) the diameter of the probe region is reduced to one half of the diameter of the entrance opening of the camera.

For example, in an illustrative embodiment: (a) camera 10 is a smartphone camera with an entrance opening of 2.36 mm; (b) the display surface is positioned at a depth s of 80 mm from the camera; (c) the camera is focused on the display surface during measurement of the subject lens; (d) the subject lens is positioned at a depth d of 40 mm from the camera; (e) the camera's focal length is less than 10 mm; and (f) the pixel width is $dp=2\times10^{-3}$ mm. In this illustrative embodiment, the diameter of each respective probe region is equal to 1.18 mm, per Equation 2. In this illustrative embodiment: (1) the refractive effect of the subject lens is maximized (because the subject lens is half way between camera and display surface); and (2) the diameter of the probe region is reduced to one half of the diameter of the entrance opening of the camera.

In some implementations of this invention, the lensometer is an eyeglass lensometer. As used herein, an "eyeglass lensometer" means a lensometer that is configured to measure an eyeglass lens to determine refractive attributes (including spherical power, cylindrical power and cylindrical axis) of that lens, and that, in particular, is configured to so measure each major type of eyeglass lens. As used herein, the "major types" of eyeglass lenses are single vision, bifocal, trifocal and progressive lenses. Thus, an eyeglass lensometer is agnostic to which major type of eyeglass lens it measures; it measures all of the major types.

For an eyeglass lensometer, it is advantageous to have a probe region diameter that is less than or equal to 4 mm, in order for the lensometer to have a sufficiently high spatial resolution to be able to accurately determine the eyeglass prescription for all of the major types (single vision, bifocal, trifocal and progressive) of eyeglass lenses. For example, such a probe region diameter is advantageous in order to accurately determine refractive attributes in a region of a progressive lens where the optical power is progressively changing.

In many implementations of this invention, the lensometer is a midway lensometer. As used herein, a "midway lensometer" means an eyeglass lensometer in which, during measurements of an eyeglass lens: (1) the display surface is located at depth d; (2) the lensometer camera is focused at depth d; and (3) d=2s, where d is the distance at which the camera is focused, and s is the distance between subject lens and the entrance opening of the camera. Thus, in a midway lensometer, during measurements of an eyeglass lens, the subject lens is located half way between the display surface and the entrance opening of the lensometer camera. As discussed above, when d=2s: (a) the refractive effect of the subject lens (as seen from the camera) is maximized, and (b) the probe region diameter D≤0.5×EO; that is, the probe region diameter is equal to or less than one half of the diameter of the entrance opening of the camera.

Thus, for a midway lensometer (in which the refractive effect of the subject lens is maximized), it is advantageous that the diameter of the entrance opening of the lensometer camera be less than or equal to 8 mm. Reason: For an eyeglass lensometer, it is advantageous to have a probe region diameter D that is less than or equal to 4 mm (as discussed above). In a midway lensometer, D≤0.5×EO; that is, the probe region diameter is equal to or less than one half of the diameter of the entrance opening of the camera (as discussed above). Thus, for a midway lensometer, Equation 2 indicates that the diameter of the entrance opening of the lensometer camera is less than or equal to 8 mm, in order for the probe diameter D to be less than or equal to 4 mm.

Furthermore, the aperture of the camera has a diameter that is less than or equal to the diameter of the entrance opening of the camera. Thus, for a midway lensometer, Equation 2 indicates that the diameter of the aperture of the lensometer camera is less than or equal to 8 mm, in order for the probe diameter D to be less than or equal to 4 mm.

In some implementations, the small aperture lensometer is an eyeglass lensometer that (a) includes a small aperture camera, and (b) has a probe region that is equal to or less than 4 mm in diameter. In some implementations, the small aperture lensometer is a midway lensometer that (a) includes a small aperture camera, and (b) has a probe region that is less than or equal to 4 mm in diameter.

Testing Area, Probe Regions

This invention is not limited to a particular size or shape of testing area (that is, the overall region of the subject lens that is being measured). Depending on the particular implementation, different sizes or shapes of a testing area may be used. For example, in some cases, the testing area: (a) is a rectangle, with a height of 30 mm and a width of 45 mm; or (b) is a circle, centered on the optical axis of the lensometer camera, with a radius of 15 mm.

In some cases, the size and shape of the testing area is fixed.

In other cases, the size or shape of the testing area are adjustable, in order to handle different sizes and shapes of subject lens that are measured. For example, conventional eyeglasses lenses have a wide range of dimensions, with many such lenses having a horizontal width between 40 cm and 62 cm, and a vertical height between 24 and 38 cm. In some use scenarios of this invention: (a) the subject lens is an eyeglass lens, (b) the lensometer camera captures an image that includes at least the frame rim (eyewire) for the subject lens, when the subject lens is at a known distance from the camera; and (c) a computer analyzes the image to determine the height and width of the eyeglass lens. In other use scenarios, a human user uses an I/O device onboard the lensometer to input data regarding the width of the eyeglass lens. (For example, in the United States, a two-digit number equal to the width of an eyeglass lens in millimeters is typically stamped on an eyeglass frame, and a human user can read this number and input it via the I/O device). For example, in some cases, the lensometer I/O device is onboard on an MCD or onboard a device that is releasably attached to an MCD.

In some cases: (a) a computer determines one or more dimensions of the subject lens (e.g., by analyzing an image of a frame rim to determine height and width of the subject lens, or by using data inputted by a human to determine the width of the subject lens), and then adjusts the size or shape of the testing area accordingly (e.g., such that the minimum distance from each side of a rectangular testing area to a point on the perimeter of the subject lens is a specified distance); (b) a computer adjusts the number or spatial pattern of distribution of the probe regions to conform to the adjustment to the size or shape of the testing region; and (c) if the display surface is programmable, the computer also outputs control signals to adjust the visual pattern displayed by the display surface (e.g., to cause the visual pattern to correspond to the adjusted size or shape of the testing area, or to cause the size, shape or spatial pattern of distribution of the probe regions to change).

This invention is not limited to any particular number or pattern of probe regions. Depending on the particular implementation, different numbers or patterns of probe regions are used. For example, in some cases: (a) the testing area is 30 mm×45 mm; (b) there are a total of 950 probe regions in the testing area; (c) the 950 probe regions are arranged in a 25×38 rectangular grid. For example, in some other cases: (a) there are a total of 2904 probe regions in the testing area; and (b) the 2904 probe regions are arranged in a 66×44 rectangular grid. In some cases, the probe regions are arranged in a spiral or in one or more circles or ellipses. For example, in some cases, the probe regions are arranged in concentric circles or ellipses, each centered at the optical axis of the lensometer camera.

This invention is not limited to any particular diameter of probe region. Depending on the particular implementation, different diameters of probe regions are used. For example, in some cases, the probe region diameter is 1.18 mm or 1.25 mm.

In some cases, the probe region diameter is fixed.

Alternatively, the probe region diameter is adjustable. For example, in some cases, the probe region diameter is adjusted by changing the depth at which the lensometer camera is focused. For example, in some other cases, the probe region diameter is adjusted by translating a lens rest (and thus the subject lens, which is supported by the lens rest) closer to or farther from the camera (e.g., along an axis that is identical or parallel to the optical axis of the lensometer camera). Per Equation 2, changing the depth at which the camera is focused (or translating the subject lens closer to or farther from the camera) has the effect of adjusting the probe region diameter. A computer outputs control signals (a) to control one or more actuators to adjust the position of one or more lens in the lensometer camera (to change the depth at which the camera is focused) or (b) to control one or more actuators to translate the subject lens closer to or farther from the camera. In some cases: (a) the display surface comprises a programmable display; and (b) a computer not only outputs control signals to adjust probe region diameter, but also outputs control signals to alter the size of visual features displayed by the display surface.

In illustrative implementations, the probe regions do not overlap each other, do not abut (touch) each other, and do not fill all of the testing area. Preventing the probe regions from overlapping (or, even better, keeping the probe regions at least slightly apart from each other) reduces measurement cross-talk. For example, in some cases: (a) the testing area is 30 mm×45 mm; (b) there are a total of 950 probe regions in the testing area; (c) the 950 probe regions are arranged in a 25×38 rectangular grid; (d) the diameter of each probe region is approximately 1.18 mm; and (e) each probe region is separated by a distance of approximately 0.02 mm from its horizontal and vertical neighbors.

In illustrative implementations, the testing area covers a majority of the area of the subject lens.

Mirror

In some implementations of this invention, light from the display surface reflects off of a mirror, before or after traveling through the subject lens, and before reaching the lensometer camera.

In some cases where a mirror is used, light from the display surface passes through the subject lens twice, before reaching the lensometer camera. FIG. 2 shows an example of this approach, in which light passes through the subject lens twice. In FIG. 2, light from a display surface 23 travels through the subject lens 12 a first time, then travels to a mirror 27, then reflects off the mirror 27, then travels through the subject lens 12 a second time, and then travels to the camera 10. Thus, in FIG. 2, light that travels along optical path 61 from the display surface 23 to the camera 10 passes through the subject lens 12 twice.

In the example shown in FIG. 2, the display surface 23 and entrance opening to the camera 10 are on the same side of the mirror 27 and are located at substantially the same distance from the mirror 27. Light from a blurred region 28 of the display surface 23 passes through probe region 26 before reaching camera 10. The diameter of probe region 26 is equal to the distance between the tips of arrows 55 and 56.

In the example shown in FIG. 2, the diameter of the entrance opening of camera 10 is greater than or equal to the diameter of each probe region of subject lens 12, including probe region 16. (As noted above, in FIG. 2, the entrance opening of the camera is coincident with the position of lens 8.)

In the example shown in FIG. 2, the entrance opening of camera 10 is surrounded by the display surface 23. The display surface 23 has a hole centered on the camera's entrance opening, so that the entrance opening is not occluded by the display surface. Alternatively, the entrance opening of camera 10 is not surrounded by the display surface.

Using a mirror has at least three advantages.

First, the optical paths from the display surface to the camera are folded by the mirror. This tends to reduce the size of the lensometer, because the mirror (e.g., as shown in FIG. 2) may be located closer to the camera than the display surface would be located in the absence of the mirror (e.g., as shown in FIG. 1), while achieving the same total length of optical path.

Second, by using a mirror, both the camera and the display surface of the lensometer may be onboard the same MCD (e.g., a smart phone). For example, in some cases: (a)

both the camera and the display surface of the lensometer are located on the same MCD (e.g., a smart phone); (b) the display surface comprises all or a portion of a display screen of the MCD; (c) the display surface displays a static or dynamic visual pattern; and (d) light from the visual pattern travels through the subject lens a first time, then reflects off a mirror, then travels through the subject lens a second time, and then travels to the camera.

Third, using a mirror makes it easy for the display surface to display a dynamic (temporally changing) visual pattern. For example, in some cases, all or a portion of the display screen of an MCD (e.g., smartphone) functions as the display surface and displays a temporal sequence of images, in which a visual pattern changes. Light from this dynamic visual pattern travels through the subject lens, then reflects off the mirror, then travels through the subject lens again, then travels to the camera, which is housed onboard the same MCD as the camera.

In embodiments in which a mirror is used, the subject lens distorts the apparent size and shape of visual features of the display surface, and shifts the apparent position of these visual features. A computer utilizes this distortion or shift (or both) in order to determine refractive attributes of the subject lens.

In the example shown in FIG. 2, the subject lens distorts the apparent size or shape (and shifts the apparent position) of visual features of display surface 23 (as seen from imaging sensor 14), as compared to the size, shape or position of these visual features in the absence of the subject lens (as seen from imaging sensor 14). A computer 19 analyzes data captured by the imaging sensor 14 to compute this distortion or shift, for each probe region respectively. Based on this computed distortion or shift, the computer 19 calculates refractive attributes for each probe region respectively.

In some cases (in which a mirror is used, and each optical path from the display surface to the camera traverses the subject lens twice), radial lines of the subject lens are exploited in order to simplify computations.

As used herein, a "radial line" of a lens means a straight line that is perpendicular to, and that intersects, the optical axis of the lens. As used herein, to say that a lens is "radially symmetric" means that the optical power of the lens is constant along each respective radial line of the lens. In a radially symmetric lens, optical power may vary from one radial line to another, but is constant along each respective radial line. A typical sphero-cylindrical eyeglass lens is radially symmetric.

In some use scenarios of this invention: (a) the optical axis of the camera and the optical axis of the subject lens are identical with each other (that is, the two optical axes are aligned with other and co-located with each other); (b) an optical path (from the display surface to the camera) intersects the same radial line of the subject lens both times that the optical path traverses the subject lens; (c) the subject lens is radially symmetric, and (d) thus, the optical power of the lens is the same at both locations at which the optical path traverses the subject lens. This is advantageous: it simplifies the computation of the optical power of the lens, compared to a situation in which an optical path encounters a different optical powers the first and second times that it traverses the subject lens.

As is well known, a spherical, cylindrical or spherocylindrical lens has a unique optical axis (global center). Likewise, some, but not all, bifocal, trifocal, and progressive lenses are manufactured with unique global centers.

For a lens with a unique global center, the optical axis of the lens and the optical axis of the camera are aligned as follows, in some implementations of this invention. The lensometer determines the position of the global center by locating the position with the least relative distortion (the zero distortion point is the global center). In some use scenarios, the lens is moved (e.g., by an actuator powered by a motor or by force exerted by a human user) until the zero distortion position (global center) is aligned with the camera optical axis.

In some cases, the camera optical axis is not aligned with the global center, which causes an asymmetric distortion contribution. A computer (e.g., onboard the MCD) performs an algorithm to computationally compensate for (remove) the asymmetric distortion contribution. In some cases, asymmetric distortion contribution is measured in advance during calibration, by using a set of pre-calibrated lenses. These calibration measurements are stored in lookup tables and translated to formulae.

Some, but not all, bifocal, trifocal, and progressive lenses have multiple optical centers for each lens region, typically changing in the top-to-bottom lens direction. The lensometer detects the presence of such lenses through the observation of multiple or a gradient of zero distortion regions (local centers) from top-to-bottom.

For a subject lens with multiple local centers, alignment of the optical axis of the camera and a local center of the lens is performed as follows, in some cases: the camera optical axis is aligned with a local center, after which the asymmetric contribution in other lens positions is compensated for following the method outlined above.

In the example shown in FIG. 2, the mirror is a flat mirror that is perpendicular to the optical axis 1 of the camera. Alternatively, the mirror is tilted (not perpendicular) relative to the optical axis 1 of the camera, or is curved, or both. In some cases in which the mirror is tilted or curved: (a) the lensometer display surface is far "off to the side" (relative to the camera optical axis); (b) the lensometer display surface is tilted (not perpendicular) relative to optical axis of the camera; or (c) the lensometer display surface is curved.

In some alternative implementations, light reflects off a mirror, but passes through the subject lens only once (not twice). That is, light from the display surface reflects off a mirror, but traverses a subject lens only once, before reaching the camera. FIG. 3 shows an example of this. In FIG. 3, light that travels along optical path 62 from the display surface 23 to the camera 10 passes through the subject lens 12 only once. In FIG. 3, mirror 27 is tilted relative to the optical axis 1 of the camera.

In some cases, using a folded optical path that reflects off a mirror but traverses the subject lens only once is doubly advantageous: (a) the folded optical path permits a small form factor for the lensometer; and (b) the fact that each optical path (from the display surface to the camera) passes through the subject lens only once tends to simplify computation of refractive attributes of the subject lens.

In cases where light from the display surface passes through the subject lens only once, the light may reflect from the mirror either before or after it traverses the subject lens.

For example, in some cases, light from the display surface reflects off the mirror before traversing the subject lens, because the display surface is positioned so far "off to the side" (relative to the optical axis of the camera) that light does not intersect the subject lens while traveling from the display surface to the mirror. Alternatively, in some cases, light from the display surface reflects off the mirror before traversing the subject lens, even though the display surface is adjacent to the lensometer camera. For example, this latter situation occurs in some situations where a set of additional mirrors steer light from the display surface around the subject lens to the main mirror. Each steering mirror is either flat or curved, and is either perpendicular or not perpendicular to an optical axis of the steering system.

In other cases, the mirror is positioned such that the light from the display surface traverses the subject lens only once, but reflects off the mirror after traversing the subject lens. This is achieved, in some cases, by positioning the camera so far "off to the side" (relative to an optical axis of the subject lens) that light does not intersect the subject lens when traveling from the mirror to the camera. In other cases, this is achieved with steering mirrors.

In some cases (including some cases in which the lensometer is configured in the manner shown in FIG. 2 or 3): (a) the display surface 23 comprises a display screen; and (b) the display surface 23, camera 10, and computer 19 are housed in a single mobile computing device, such as smartphone or webcam.

Static or Dynamic Display

In some embodiments of this invention, the display surface 23 displays a static visual pattern.

Alternatively, in some cases, the display surface 23 displays a dynamic (temporally changing) visual pattern. Light from this dynamic visual pattern travels through subject lens 12 and then to the camera.

For example, in some cases, display surface 23 comprises a programmable electronic display that displays a pattern of visual features that varies temporally (i.e., changes over time). That is, the screen displays a temporal sequence of images, such that the image displayed appears to change over time. Any display technology is used for the programmable display screen. For example, in some cases, the programmable display screen comprises an LCD (liquid crystal display) screen, an AMOLED (active matrix organic light emitting diode) screen, or an AMLCD (active matrix liquid crystal display) screen. In some cases, the programmable electronic display screen comprises a spatial light modulator (e.g., LCD) that selectively attenuates light. For example, in some cases, the spatial light modulator is back lit by a light box (e.g., by a translucent panel that is illumined from behind by one or more light sources).

In some cases, the display surface 23 is a programmable electronic display screen that is onboard an MCD. For example, in some cases: (a) the MCD comprises a smartphone, digital music player, monitor with webcam, or laptop; and (b) display surface 23 comprises all or a portion of a display screen of the MCD.

Alternatively, in some cases, the display surface 23 includes a plurality of controllable, active light sources, and these active light sources together display a dynamically changing visual pattern. For example, in some cases, the display surface 23 comprises light-emitting-diodes (LEDs) or organic light-emitting-diodes OLEDs). In some cases, one or more of these active light sources are located onboard a MCD (e.g., onboard a smartphone).

One or more computers 19 perform computational tasks, including analyzing data captured by the camera, calculating distortion or shift, computing refractive attributes, and (in some cases) controlling a display screen that comprises the display surface 13.

In illustrative implementations, any display technology (including one or more of the display technologies described above) is used for a programmable display, regardless of where the display surface 23 is positioned relative to the camera and the subject lens.

In some implementations, the computer uses data regarding images captured by the camera as feedback, in order to control operation of the lensometer. For example, in some cases, the computer computes data regarding image distortions that are caused by the subject lens, and uses that data in order to adjust either: (a) the display displayed on a display screen, or (b) physical position of the subject lens relative to the camera or relative to the display screen. For instance, a computer may, based on the data regarding image distortion, output control signals to control the display screen, such that the display screen alters the shape, size or position of visual features (such as dots) displayed on the display screen. Or, for instance, a computer may, based on the data regarding image distortion, output control signals to control one or more actuators, such that the actuators cause the distance between the camera and subject screen to increase or decrease, or cause the distance between the display screen and subject lens to change, or cause the subject lens to move laterally (in a direction substantially parallel to) the display screen.

Housing

In illustrative implementations, a display surface (e.g., 23) or a mirror (e.g., 27) is supported by a housing (not shown).

The housing also supports a lens rest (not shown) for the subject lens 12. The lens rest supports the subject lens in a constant position, relative to the housing. The housing includes a slot or other opening through which the subject lens (and frames for the lenses, if applicable) are inserted and removed.

The housing is releasably attached to a mobile computing device (MCD), such as a smartphone or webcam (not shown). A camera 10 is housed in the MCD.

For example, in some cases, the housing is releasably attached to the MCD by one or more of the following: (a) flexible components that snap together and snap apart; (b) components that are releasably attached to each other by friction, pressure or magnetism (such as clips, magnets, or a fabric hook and loop fastener (e.g., Velcro® straps); (c) components that are shaped to interlock with each other and to be releasable only by movement in certain directions and not in other directions (e.g., a zipper); (d) one or more straps; (e) a first component comprising a slot or hole and a second component configured to fit into, and be removed from, the slot or hole; or (f) any other fastener configured to repeatedly hold together (and then release) two objects.

Advantageously, in many cases, the housing is compact and lightweight.

In some cases, a mirror configuration (such as shown in FIG. 2 or 3) is used to fold optical paths of the lensometer and thus to reduce the size of the housing.

In some implementations, the size of the housing is reduced by positioning the display surface at an optical distance from the camera that is substantially equal to the minimum depth at which the lensometer camera focuses (e.g., 6 cm. for smartphones). In some cases, a macro lens is used to reduce the minimum depth at which the camera focuses. The macro lens is housed in, or attached to, the camera.

Here are three non-limiting examples of compact dimensions of a lensometer, in illustrative implementations of this invention. First, in some cases: (a) optical paths from the display surface to the camera are not folded by a mirror; and (b) the display surface and subject lens are positioned at an optical distance from the camera (along the optical axis of the camera) of 60 mm and 30 mm, respectively. Second, in some cases: (a) optical paths from the display surface to the camera are not folded by a mirror; and (b) the display surface and subject lens are positioned at an optical distance from the camera (along the optical axis of the camera) of 80 mm and 40 mm, respectively. Third, in some cases: (a) a mirror is used to fold optical paths; and (b) the mirror and subject lens are positioned at an optical distance from the camera (along the optical axis of the camera) of 50 mm and 40 mm, respectively.

In many use scenarios, the camera 10 focuses on the display surface 23 prior to taking refractive measurements.

However, in some use scenarios, the lensometer camera is not focused on the display surface 23 while refractive measurements are taken. For example, in some use scenarios: (a) the camera is focused at a depth of 6 cm; and (b) the display surface and subject lens are positioned at depths (along the optical axis of the camera) of 10 cm and 5.5 cm, respectively. This invention does not require that images of the display surface be perfectly focused while the subject lens is being measured. For example, in many cases, the camera captures unfocused images of regions (e.g., 18 or 28) of the display surface when the subject lens is present.

In some alternative implementations, the housing and MCD are not separate components; instead, the small aperture lensometer comprises a single integral structure that houses a small aperture camera, display surface and computer.

Calculation of Optical Properties

In illustrative implementations, the subject lens 12 refracts—that is, bends—light passing through points of the subject lens (except light traveling along an optical axis of the subject lens). This bending causes visual features of the display surface to appear (when seen from the camera) distorted or shifted, as compared to how the visual features appear (when seen from the camera) when the subject lens is removed. A computer analyzes data captured by the lensometer camera 10 in order to measure this distortion or shift for each respective probe region, and based at least in part on this measured distortion or shift, computes an optical power or other refractive attribute (e.g., prism or base) for the respective probe region. In many cases, the determination of the distortion or shift, and of the optical power or other refractive attribute, is independent for each respective probe region.

Figure 4A:
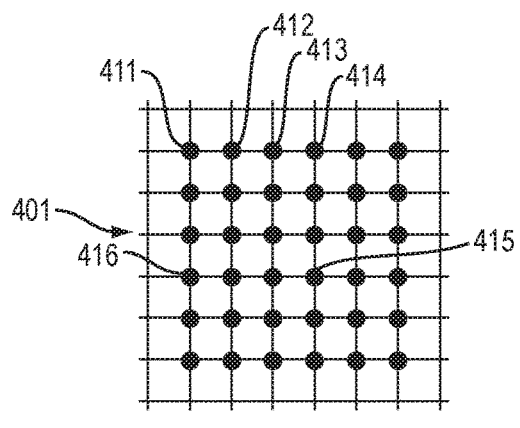
FIGS. 4A, 4B, 4C, and 4D show images captured by a camera of a lensometer.
Figure 4B:
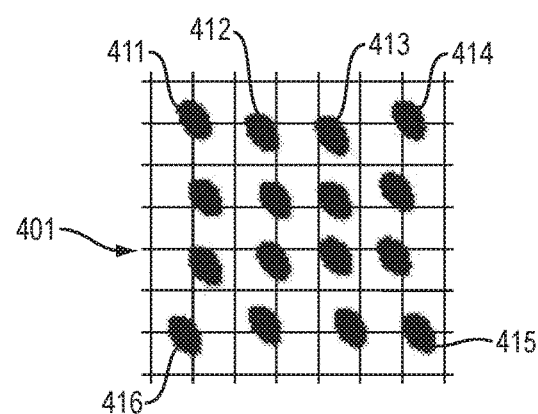
Figure 4C:
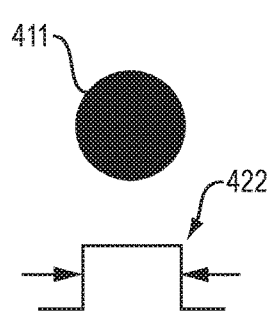
Figure 4D:
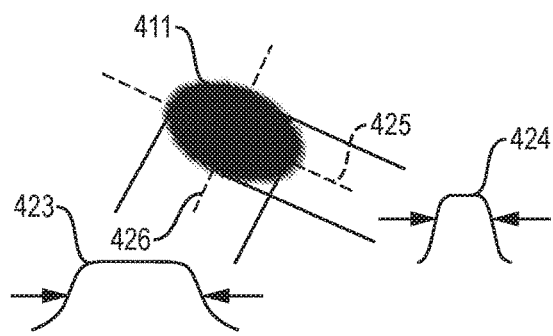

FIGS. 4A, 4B, 4C, and 4D show images captured by a camera of a lensometer. In FIGS. 4A and 4C, the image is captured with the subject lens 12 absent, and thus visual features of the image are not distorted by the subject lens. In FIGS. 4B and 4D, the image is captured with the subject lens 12 present, and thus visual features of the image are distorted by the subject lens.

FIGS. 4A and 4B show an image of visual features displayed by a display surface 23. The image is captured by camera 10. In the examples shown in FIGS. 4A and 4B: (a) the visual features are circular dots (e.g., dots 411, 412, 413); and (b) the display surface 23 displays the dots in a rectangular grid pattern 401. (The lines in the grid pattern are shown in FIGS. 4A and 4B to indicate the spatial arrangement of the dots. However, in most cases, the lines in the grid pattern are not actually displayed by the display surface 12 and do not appear in images captured by the camera 10.)

FIG. 4A shows an image captured by the camera 10 with the subject lens 12 absent. Thus, to form the image shown in FIG. 4A, light traveled from the display surface to the camera but did not pass through the subject lens. Thus, subject lens did not distort the image shown in FIG. 4B, and the dots are each centered at an intersection of two lines in the grid pattern 401.

FIG. 4B shows an image captured by the camera 10 with the subject lens 12 present. Thus, to form the image shown in FIG. 4B, light traveled from the display surface to the camera, and in the course of doing so, passed at least once through the subject lens. Thus, the subject lens distorted the image shown in FIG. 4B. For example, dots 411, 412, 413 are each distorted into an elliptical shape (as compared to a circular shape when the subject lens is absent). Also, for example, dot 412 and 413 are displaced as a whole, so that the center of dots 412 and 413 are not located at an intersection of lines in the grid pattern 401.

In FIG. 4C, the image is captured with the subject lens 12 absent. Thus, in FIG. 4C, dot 411 is undistorted and still circular.

In FIG. 4D, the image is captured when the subject lens is present and refracts light that travels from the display surface through the subject lens to the camera. Thus, in FIG. 4D, dot 411 is distorted. In the example shown in FIG. 4D, the distortion causes dot 411 to be elliptical (and non-circular).

Figure 4E:
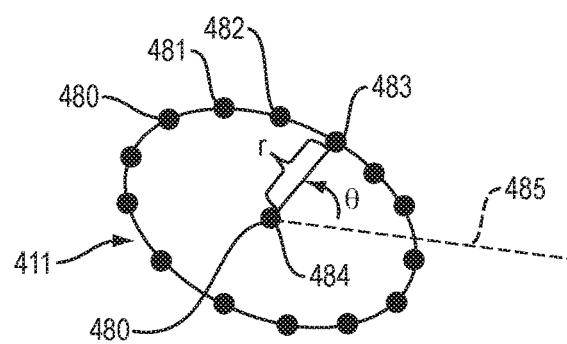
FIG. 4E shows points on the perimeter of a visual feature.

In some cases, the dots are displayed on the display surface, such that the center of each dot displayed on the display surface is aligned with an intersection of two grid lines of a rectangular or square grid. FIGS. 4A and 4C show undistorted visual features of the display surface, as seen from the camera when the subject lens is not inserted into the housing, and thus is not refracting light from the display surface. FIGS. 4B, 4D and 4E show distorted and shifted visual features of the display surface, as seen from the camera when the subject lens is inserted into the housing, and thus is refracting light from the display surface.

When the subject lens is absent and is not distorting the dots, the dots appear circular in the captured image.

However, when the subject lens is present, it refracts light from the display surface, distorting the appearance of the dots (in an image captured by the camera). If the subject lens is a purely spherical lens, with no astigmatism, then the distortion changes the apparent size, but not the apparent shape, of the dots. If the subject lens is astigmatic, then the distortion also changes the apparent shape of the dots, elongating the dots more along the cylindrical axis of the subject lens than in other directions. Specifically, if a probe region of the subject lens is astigmatic, then: (a) the subject lens distorts the dots, such that the dots on the display surface appear (when seen from the camera through the probe region) to be ellipses; (b) the major axis of each ellipse is aligned with the cylindrical axis of the subject lens; and (c) the minor axis of each ellipse is aligned perpendicular to the cylindrical axis.

In FIGS. 4B, 4D and 4E, the dots (e.g., 411, 412, 413) appear to be non-circular ellipses (in an image captured by the camera), because an astigmatic subject lens is present and is refracting light from the display surface. For example, in FIG. 4D, the non-circular ellipse of dot 411 has a major axis (which is the portion of line 425 that is inside dot 411) and a minor axis (which is the portion of line 426 that is inside dot 411).

In some cases, the subject lens 12 distorts the image by (among other things) causing the edge of a visual feature to appear blurry. In FIGS. 4B and 4D, the dots appear blurry due to distortion caused by the subject lens.

In FIGS. 4C and 4D, plots 422, 423, 424 are each a plot of intensity of light along a geometric line in the image that intersects dot 411. In FIG. 4D, plot 423 is a plot of light intensity along line 425 and plot 424 is a plot of light intensity along line 426.

In FIG. 4C: (a) the image is not distorted (because the subject lens is absent); and (b) light intensity varies in a square wave in plot 422, such that intensity rises vertically at one edge of the dot and falls vertically at another edge of the dot.

In FIG. 4D: (a) the image is distorted (because the subject lens is present and refracts light before it reaches the camera); and (b) light intensity in plots 423 and 424 varies more gradually, such that intensity rises gradually at one edge of the dot and falls gradually at another edge of the dot.

In illustrative implementations, a computer performs any of a wide range of algorithms, in order to determine refractive attributes of a subject lens, based on distortion or shift of images caused by the subject lens.

In illustrative implementations of this invention, the camera captures a first image when the subject lens is present and a second image when the subject lens is absent. One or more computers compare the first and second images, in order to compute refractive attributes of the subject lens.

This calculation (which involves comparing the first and second images in order to compute refractive attributes of the subject lens) may be done in different ways. Here are three non-limiting examples.

First Example

In some implementations of this invention, a computer identifies pairs of visual features. For each pair of visual features, the computer compares the distance between the pair in the first image and the distance between the pair in the second image. In addition, the computer compares the orientation of a line that connects the pair in the first image and the orientation of that line in the second image. These changes in distance and orientation are distortions caused by the subject lens. By comparing the distance and orientation in the first image with the distance and orientation in the second image, the computer calculates a refractive attribute (e.g., cylindrical power and cylindrical axis) of the subject lens. For example: (a) a computer may process the images shown in FIG. 4A (taken with the subject lens absent) and in FIG. 4B (taken with the subject lens present); (b) the computer may identify multiple pairs of dots, such as the pair consisting of dots 411 and 414, the pair consisting of dots 411 and 415, the pair consisting of dots 411 and 416, the pair consisting of dots 414 and 415, and the pair consisting of dots 414 and 416; (c) for each pair, the computer may compare the distance between the dots in the pair in the first image and the distance between the dots in the pair in the second image; and (d) for each pair, the computer may compare the orientation of a line that connects the pair in the first image and the orientation of that line in the second image. By comparing these distances and orientations, the computer calculates a refractive attribute (e.g., cylindrical power and cylindrical axis) of the subject lens.

Second Example

In some implementations of this invention, refractive attributes of the subject lens are computed by analyzing major and minor axes of ellipses, as follows: In some implementations, a computer (e.g. 19) analyzes data captured by the camera, in order to compute the length of the major and minor axes of distorted dots in images refracted by the subject lens. If the minor and major axes are equal to each other, then the subject lens is purely spherical and the computer calculates spherical power of the subject lens based on the ratio of the radius or diameter of the distorted dot to the radius or diameter of the undistorted dot. If the major and minor axes are not equal to each other, then the subject lens is astigmatic, and the computer computes the angle of the cylindrical axis based on the orientation of the major axis and calculates the cylindrical power based on (i) an elliptical ratio (as defined herein); (ii) an inverse of an elliptical ratio, (iii) an axis ratio (as defined herein), or (iv) an inverse of an axis ratio.

As used herein (including in this second example of computing refractive attributes):

A "major axis dimension" of an ellipse means the length of a major axis or semi-major axis of the ellipse.

A "minor axis dimension" of an ellipse means the length of a minor axis or semi-minor axis of the ellipse.

An "axis dimension" means a minor axis dimension or a major axis dimension.

An "elliptical ratio" means a ratio of (i) an axis dimension of an elliptical, distorted dot to (ii) the radius or diameter of a circular, undistorted dot. For purposes of the preceding sentence, a "undistorted dot" is a dot in an image captured with the subject lens absent, and a "distorted dot" is a dot in an image captured with the subject lens present.

An "axis ratio", in the context of an ellipse, means a ratio of (i) a major axis dimension of the ellipse to (ii) a minor axis dimension of the ellipse.

Third Example

In some implementations of this invention, a computer calculates a first function that describes the perimeter of a visual feature in the first image, and calculates (or looks up calibrated data regarding) a second function that describes the perimeter of the visual feature in the second image. A computer compares the first and second functions, in order to calculate a refractive attribute of the subject lens. For example, in some cases: (a) the visual feature is a dot; (b) a computer calculates a first function for the first image and a second function for the second image; (c) the first and second functions are each distance (from the center of the dot to the perimeter of the dot) as a function of polar angle; and (d) the computer compares the first and second functions in order to compute a refractive attribute of the subject lens. For example, the function may be a sinusoidal function that best fits samples at discrete polar angles.

FIG. 4E shows points (e.g., 480, 481, 482, 483) on the perimeter of a visual feature. The visual feature is a dot 411 that appears elliptical, due to distortion caused by the subject lens 12. A computer processes an image to determine the position of points on the perimeter. For example, in some cases, a computer calculates the position of perimeter points in polar coordinates. For example, a computer may calculate the position of point 483 in terms of its distance r from the centroid 484 of the elliptical dot and in terms of its polar angle θ relative to a reference direction 485.

Figure 4F:
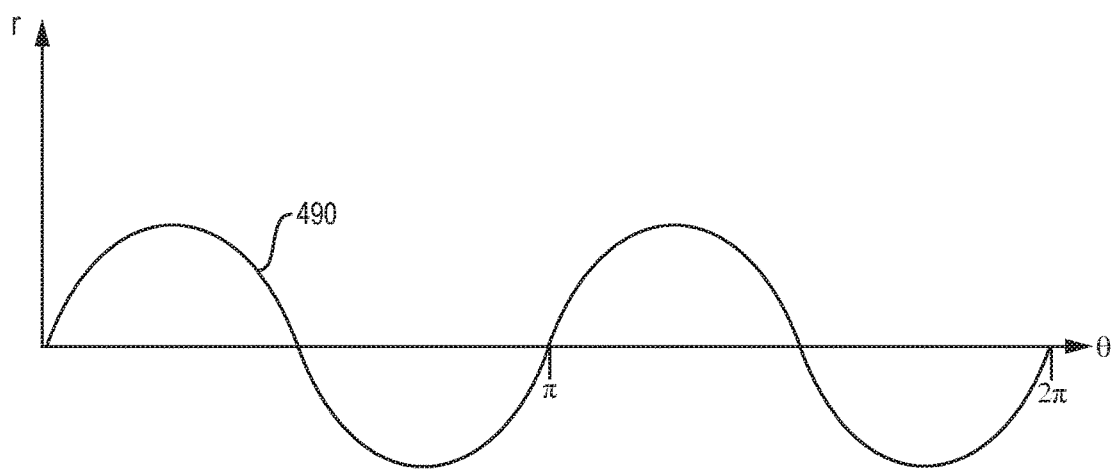
FIG. 4F shows a plot of a function that fits the position of points on the perimeter of a visual feature.

A computer may, after computing the position of points on the perimeter of a visual feature, compute a function that fits the points. For example, FIG. 4F shows a plot of a function that fits the position of points on the perimeter of a visual feature. In FIG. 4F, the position of the points is expressed in polar coordinates, where r is distance from the origin of the polar coordinate system and θ is polar angle relative to a reference direction.

A computer may compare this calculated function (which describes the perimeter of a distorted shape) to data in a look-up table stored in electronic memory. The look-up table contains data gathered during calibration. For example, the look-up table includes data regarding a function that describes the perimeter of an undistorted shape, and also includes data regarding a set of functions for distorted shapes that correspond to different spherical powers, cylindrical powers or cylindrical axes of a subject lens.

The number of polar angles (and thus the number of points along the perimeter) that are sampled for each visual feature (e.g., dot) may vary. For example, in some cases, the number of polar angles sampled is two. In other cases, the number of polar angles sampled is more than two. Increasing the number of polar angles sampled tends to improve the signal to noise ratio. For example, sampling a large number of polar angles (e.g., ten or more polar angles) tends to make the measurements more robust against noise.

The major axis/minor axis method described above is a special case of this polar coordinates approach. In this special case, the number of polar angles sampled are only two and the sampled polar angles correspond to the major and minor axes.

In some cases, a computer calculates prism (prismatic displacement) based on magnitude of the shift and calculates base (direction of prismatic displacement) based on the direction of the shift. In some cases, in order to calculate prism and base, a computer measures overall apparent shift of a visual pattern, without determining which displaced visual feature corresponds to which visual feature in the unshifted image. In other cases, in order to calculate prism and base, a computer determines such a correspondence.

In some cases, a computer determines spherical power, cylindrical power or cylindrical axis based on apparent shift (displacement) caused by the subject lens. For example, if a display surface displays a rectangular grid of dots, then, as seen from the camera: (a) a subject lens with a positive diopter causes the dots to appear to move further from each other; and (b) a subject lens with a negative diopter causes the dots to appear to move closer to each other, in each case as compared to a reference image captured when the subject lens is not present. By comparing an images captured with the subject lens present and an image captured with the subject lens absent, a computer computes the apparent movement of visual features (e.g., changes in distance between dots, or changes in orientation of lines between dots) due to distortion caused by the subject lens, and uses this computed movement to calculate sphero-cylindrical refractive attributes of the subject lens. The computer uses one or more formulas or one or more look-up tables to perform these computations. In some cases, a computer maps a shifted visual feature (in an image refracted by the subject lens) to a corresponding unshifted visual feature (in an image captured when the subject lens is not present).

Displacement of individual visual features (e.g., dots) relative to each other may comprise distortion of an overall visual pattern (e.g., such as apparent stretching or scaling of the overall pattern), This invention is not limited to circular dots: the display surface 23 may display any shape of visual feature. For example, in some cases, the display surface 23 displays visual features that are polygons (e.g., squares or triangles) or stars. In some cases, if the shape of a visual feature (as displayed by the display surface) is not circular, then a function that describes the perimeter of a distorted image of that shape in polar coordinates is periodic.

In some implementations, the visual pattern displayed by the display surface displays has only one visual feature (e.g., circular dot) per probe region. Alternatively, the number of visual features (e.g., circular dots) displayed by the display surface is different than the number of probe regions. For example, in some cases, light from multiple visual features (e.g., circular dots) passes through a single probe region before reaching the lensometer camera.

In illustrative implementations, one or more computers perform algorithms for digital image processing and computer vision, with respect to images captured by the lensometer's camera. For example, in some cases, a computer performs an edge detection algorithm to detect a perimeter of a visual feature. For example, in some cases, the edge detection algorithm comprises an image gradient algorithm (e.g. with a Sobel or Prewitt mask), Marr-Hildreth edge detection algorithm, or Canny edge detection algorithm. For example, in some cases, a computer performs an algorithm to represent a perimeter of a shape. For example, in some cases, a computer uses any of the following algorithms to represent the perimeter of a shape: a Moore boundary tracking algorithm, a chain code algorithm (e.g., a Freeman chain code algorithm), or an algorithm for polygonal approximation using minimum perimeter polygons (e.g., an MPP algorithm). For example, in some cases, a computer performs an algorithm to determine the center point of a shape (e.g., a thinning or erosion algorithm, watershed, Hough transform, or a simple column-row line scan).

In some cases, a computer takes into account, when computing refractive attributes of the subject lens, point spread function of an image captured with the subject lens present or point spread function of an image captured with the image absent (or both). For example, a subject lens may make an image sufficiently blurry that a single point source of light on the display screen contributes to light intensity at multiple pixels of the camera. A computer may take the point spread function (and thus the extent to which a single point source of light contributes to measured light intensity at multiple pixels) into account when processing an image and calculating distortions (such as changes in distance or angle in the image) caused by the subject lens.

In some cases, one or more computers: (a) analyze camera images in order to compute refractive attribute(s) at many probe regions in a subject lens; (b) use these computed refractive attributes in order to map refractive attributes over an area of the surface of the subject lens; and (c) calculate one or more Zernike polynomials that describe this area of the surface of the subject lens.

In illustrative implementations of this invention (such as the examples discussed above), during a previous calibration step, images may be captured with the subject lens absent, and data regarding these images may be stored in memory, such as in a look-up table. Likewise, during a previous calibration step, images may be captured with different subject lenses that have known refractive attributes, such as a known spherical power, or known cylindrical power or known cylindrical axis, and data regarding these images may be stored in memory, such as in a look-up table. When testing a given subject lens: (a) a camera may capture an image with the given subject lens present, and (b) a computer may compare this image with the calibration data stored in memory (such as in a look-up table).

This invention is not limited to measuring refractive attributes of refractive optical elements (such as a lens). For example, in some cases, the lensometer of the present invention measures optical attributes of: (a) a diffractive optical element; or (b) an optical element with semi-opaque or varying diffusive optical properties.

In some implementations of this invention, one or more computers calculate differences between (a) an image taken with the subject lens present and (b) one or more other images captured with the subject lens absent. Based on these differences, the computers calculate a refractive attribute of a subject lens.

As used herein, an "image" captured by a camera means data derived from a single image of a scene captured by the camera in a single exposure or data derived from multiple images of a scene captured by the camera in multiple exposures. For example, a camera may take multiple exposures to capture multiple images of a scene, and one or more computers may process these multiple images in order to create an "image" that has super-resolution (i.e., a resolution greater than the native resolution of the camera hardware), or that has enhanced sub-pixel localization of features such as the centroid of a dot, or that has an improved signal-to-noise ratio. For example, in some cases: (a) a camera captures a first set of multiple images of a scene with a subject lens present; (b) the camera captures a second set of multiple images of the scene with the subject lens absent; (c) a computer processes the first set of multiple images to create a first "image" of the scene with the subject lens present and processes the second set of multiple images to create a second "image" of the scene with the subject lens absent; and (d) a computer compares the first and second images in order to compute a refractive attribute of the subject lens. Likewise, to say that a camera "captures an image" means that (i) the camera captures one or more images in one or more exposures, and (ii) one or more computers perform calculations that take these one or more images as an input and that output a processed image.

Further Details

In illustrative implementations, the lensometer takes measurements of different probe regions of the subject lens simultaneously. For each probe region in the subject lens, the lensometer measures at least one refractive attribute (e.g., spherical power, cylindrical power, cylindrical axis, prism or base) of each probe region. FIG. 5 shows multiple probe regions (e.g., 501, 502, 503, 504, 505) of a subject lens 12. In practice, the actual number of probe regions may be much more than shown in FIG. 5.

FIG. 6 describes steps in a method of measuring refractive attributes of multiple probe regions of a subject lens. The method includes the following steps: A camera captures a first image of light, which light leaves a display surface and travels through a subject lens before reaching the camera. The first image is an image of a set of visual features displayed at the display surface. The camera includes a sensor for measuring intensity of light and also includes a lens system. The aperture of the camera is small and fixed. The aperture and the lens system are each located between the subject lens and the sensor (Step 601). One or more computers perform calculations to compute, for each respective region in a set of multiple regions of the subject lens, a refractive attribute of the respective region. The calculations include comparing (i) data derived from the first image and (ii) data derived from a second image captured with the subject lens absent. For example, in some cases, one or more computers compare data from the first image and the second image by: (i) identifying a pair of visual features; (ii) detecting change in distance between the visual features in the pair; and (iii) detecting change in orientation of a line that intersects the visual features in the pair. In other cases, one or more computers compare data from the first image and the second image: (i) by computing an elliptical ratio; or (ii) by comparing a function that is fitted to points in the first image and a function that is fitted to points in the second image. (Step 602).

In many implementations of this invention:
(a) when the lensometer is measuring a subject lens, the lensometer camera is focused at a distance less than optical infinity and the lensometer does not include any telecentric arrangement of optical elements;
(b) the lensometer does not include a lens (e.g., a projecting lens) that is positioned optically between the display surface and the subject lens;
(c) all of the lenses of the camera are located optically between the subject lens and the camera's imaging sensor;
(d) the aperture of the camera is located optically between the subject lens and the camera's imaging sensor; and
(e) after light exits the subject lens, one or more lenses may converge the light (at least to some extent) before the light reaches the imaging sensor of the lensometer camera.

In illustrative implementations, the subject lens 12 comprises a lens of corrective eyeglasses or lens from an optometrist lens kit. The subject lens has any combination of concave and convex front and back surfaces and curvatures. In some cases, the subject lens comprises: (a) a bifocal, trifocal or progressive lens; or (b) any other lens in which local optical refractive parameters of the subject lens varies over a spatial region. In some cases, the subject lens comprises: (a) a lens from sunglasses; or (b) any other lens with varying or uniform neutral density levels.

In some cases: (a) the lensometer comprises a MCD and a releasably connected housing, and (b) the MCD comprises a web-cam.

In some cases: (a) the lensometer comprises a MCD and a releasably connected housing; (b) the MCD comprises a web-cam and a computer; and (c) the computer is linked to the web-cam via a wired or wireless communication link (e.g., a USB cable).

Fixed-Mini-Aperture

In many implementations of this invention, the lensometer's camera has an aperture that is both small (less than or equal to 8 mm in diameter) and fixed. That is, in many implementations, the camera has a fixed-mini-aperture, as that term is defined herein. (The camera is housed in the MCD, which is releasably attached to the housing, as discussed above).

A fixed-mini-aperture is advantageous for many reasons. Among other things, a fixed-mini-aperture enables a small form factor for the camera, reduces manufacturing costs, and is less prone to breaking down than an adjustable aperture.

In some implementations, the lensometer's camera has an effective aperture that is less than or equal to 8 mm in diameter. In some implementations, the lensometer's camera has an entrance opening that is less than or equal to 8 mm in diameter.

Field of Endeavor

Usually, MCDs have a fixed-mini-aperture camera.

The inventors of this invention were confronted by at least three problems:

(1) how to use a fixed-mini-aperture camera onboard an MCD as a camera for a lensometer; (2) how to use a computer and fixed-mini-aperture camera onboard an MCD as a computer and camera for a lensometer; and (3) how to use a computer, display screen and fixed-mini-aperture camera onboard an MCD as a computer, display screen and camera for a lensometer.

In illustrative implementations, a field of endeavor of this invention is small aperture lensometers.

Computers

In exemplary implementations of this invention, one or more electronic computers (e.g. 19) are programmed and specially adapted: (1) to control the operation of, or interface with, hardware components of a small aperture lensometer, including a small aperture camera (including actuators for changing the focal length of a camera), one or more display screens, and one or more other light sources; (2) to control the operation of, or interface with, hardware components of a MCD, including any touch screen, I/O device or other user interface, or any camera, light source, display screen of an MCD; (3) to analyze sensor data, including sensor data gathered by a camera; (4) to calculate, based on sensor data, distortion or shift of visual features in images captured by a camera; (5) to calculate, based on such distortion or shift, refractive properties of an optical element (e.g., a subject lens); (6) to calculate a major axis or minor axis of an elliptical shape; (7) to calculate a function (e.g., a periodic or sinusoidal function) that describes a perimeter of a shape in polar coordinates, including by calculating a function that best fits samples at different polar angles; (8) to compare data regarding an image distorted or shifted by a subject lens (or by another optical element being measured) with reference data (including data in a look-up table stored in a memory device), which reference data is associated with an undistorted image or with optical elements that have different optical properties (e.g., different sphero-cylindrical properties); (9) to control or interface with any device (including any computer bus, port, network connection, network interface device, wireless module, wireless card, signal processor, modem, router, client computer, host computer, or network node computer) for communication, via a wired or wireless communication link, with one or more nodes of a network; (10) to calculate optical properties of an optical element, including non-refractive properties such as diffraction or diffusion, and including an optical element other than a lens; (11) to perform image processing or computer vision algorithms, (12) to perform any other calculation, computation, program, algorithm, computer task or computer function described above; (13) to receive signals indicative of human input; (14) to output signals for controlling transducers for outputting information in human perceivable format; and (15) to process data, to perform computations, to execute any algorithm or software, and to control the read or write of data to and from memory devices (items 1-15 of this sentence are referred to herein as "Computer Tasks").

The one or more computers are located in any position or positions within or outside of the lensometer (including the MCD and housing). For example, in some cases (a) at least one computer is housed in or together with other components of the lensometer; and (b) at least one computer is remote from other components of the lensometer. The one or more computers are connected to each other or to other components in the lensometer either: (a) wirelessly, (b) by wired connection, or (c) by a combination of wired and wireless connections.

In exemplary implementations, one or more computers are programmed to perform any and all calculations, computations, programs, algorithms, computer tasks and computer functions described herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, while a program is executing, a control unit in a computer fetches the next coded instruction from memory.

Machine-Accessible Media

In illustrative implementations, one or more computers execute programs according to instructions encoded in one or more a tangible, non-transitory, computer-readable media. For example, in some cases, these instructions comprise instructions for a computer to perform any calculation, computation, program, algorithm, computer task or computer function described herein. For example, in some cases, instructions encoded in a tangible, non-transitory, computer-accessible medium comprise instructions for a computer to perform the Computer Tasks.

Network Communication

In illustrative implementations of this invention, a lensometer (or a MCD that is part of the lensometer) is configured for communication via a wired or wireless connection with other electronic devices in a network.

For example, in some cases, the lensometer (or a MCD that is part of the lensometer) includes one or more of the following hardware components for network communication: a computer bus, a computer port, network connection, network interface device, host adapter, wireless module, wireless card, signal processor, modem, router, computer port, cables or wiring.

In some cases, one or more computers (onboard the lensometer or onboard a MCD that is part of the lensometer) are programmed by one or more computer programs for communication over a network. For example, in some cases, one or more computers are programmed for network communication: (a) in accordance with the Internet Protocol Suite, or (b) in accordance with any other industry standard for communication, including any USB standard, ethernet standard, wireless standard, or IEEE communication standard.

I/O Devices

In illustrative implementations, a lensometer includes, or interfaces with, I/O devices. For example, in some cases, all or some of the I/O devices are located onboard a MCD that forms part of the lensometer. Alternatively, one or more of the I/O devices are located onboard the housing (which releasably attaches to the MCD). Alternatively, one or more the I/O devices are remote from the rest of the lensometer, and are connected to the lensometer (e.g., to the MCD) via a wired or wireless communication link.

For example, in some cases, the I/O devices comprise one or more of the following: touch screens, cameras, microphones, accelerometers, gyroscopes, magnetometers, inertial measurement units, pressure sensors, touch sensors, capacitive sensors, buttons, dials or sliders.

In illustrative implementations, a human inputs data or instructions via one or more I/O devices. The lensometer outputs data or instructions (including data regarding optical attributes of an optical element being tested) via one or more I/O devices.

Actuators

In illustrative implementations, the lensometer includes actuators. For example, in some cases, one or more actuators: (a) translate the lens(es) of the lensometer camera to change the focal length of the camera; or (b) translate the optical element being measured (e.g., a subject lens) either closer to, are farther from, the lensometer camera, along the optical axis of the lensometer camera.

In illustrative implementations, each actuator (including each actuator for actuating any movement) is any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists.

To say that a subject lens is "absent", in the context of a lensometer, means that the subject lens is positioned such that light that travels from a display surface of the lensometer to a camera of the lensometer does not pass through the subject lens.

The "aperture" of a camera means a physical opening in the camera such that: (a) for a given illumination incident on the camera, the diameter of the opening determines (or is one of the factors that determines) the amount of light that reaches the image plane of the camera; and (b) when the camera is focused, the diameter of the opening determines (or is one of the factors that determines) angles of light rays that come to a focus in the image region of the camera. The location and physical form of an aperture may vary, depending on the particular configuration of a camera. For example, in some cases, the "aperture" of a camera comprises (a) an iris, stop, or diaphragm inside the camera, or (b) the inside diameter of a frame of a lens, or (c) the entrance opening of the camera.

"Axis ratio" is defined elsewhere in this document.

To compute "based on" data means to perform a computation that takes the data as an input.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. For example, in some cases, a "computer" comprises: (a) a central processing unit, (b) an ALU (arithmetic logic unit), (c) a memory unit, and (d) a control unit that controls actions of other components of the computer such that encoded steps of a program are executed in a sequence. In some cases, a "computer" also includes peripheral units including an auxiliary memory storage device (e.g., a disk drive or flash memory). However, a human is not a "computer", as that term is used herein.

"Defined Term" means a term or phrase that is set forth in quotation marks in this Definitions section.

"Display screen" means an electronic screen for displaying images.

"Display surface" means a surface that displays a visual pattern. The visual pattern may either be static or may change over time.

For an event to occur "during" a time period, it is not necessary that the event occur throughout the entire time period. For example, an event that occurs during only a portion of a given time period occurs "during" the given time period.

The term "e.g." means for example.

"Elliptical ratio" is defined elsewhere in this document.

"Entrance opening" of a camera means a physical opening through which light that travels to the imaging sensor of the camera first enters the camera.

Each equation above is referred to herein by the equation number set forth to the right of the equation. For example: "Equation 1" means Equation 1 above. "Equation 2" means Equation 2 above The term "eyeglass lensometer" is defined elsewhere in this document.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

To say that an aperture of a camera is "fixed" means that the diameter of the aperture is not adjustable and is constant during operation of the camera. To say that an entrance opening of a camera is "fixed" means that the diameter of the entrance opening is not adjustable and is constant during operation of the camera.

Fixed-mini-aperture" means an aperture that is fixed and that has a diameter that is less than or equal to 8 mm.

"Fixed-mini-aperture camera" means a camera that has fixed-mini-aperture.

"Fixed-mini-aperture lensometer" means a lensometer that includes a fixed-mini-aperture camera.

"For instance" means for example.

In the context of a camera (or components of the camera), "front" is optically closer to the scene being imaged, and "rear" is optically farther from the scene, during normal operation of the camera.

"Herein" means in this document, including text, specification, claims, abstract, and drawings.

An "image of" a set of visual features means an image that includes the set of visual features.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"I/O device" means an input/output device. Non-limiting examples of an I/O device include any device for (a) receiving input from a human user, (b) providing output to a human user, or (c) both. Non-limiting examples of an I/O device also include a touch screen, other electronic display screen, keyboard, mouse, microphone, handheld electronic game controller, digital stylus, display screen, speaker, or projector for projecting a visual display.

"Lens" means a single lens, compound lens or lens system.

"Lens system" means (a) a lens, or (b) a set of multiple lenses, configured such that at least one optical path exists that passes through each of the multiple lenses in the set.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

The term "midway lensometer" is defined elsewhere in this document.

"Mobile computing device" or "MCD" means a device that: (a) includes a computer and a camera; and (b) comprises either (i) a smartphone, web-cam, mobile digital media player, portable media player, digital audio player, cell phone, mobile phone, phonepad computer, tablet computer, laptop computer, notebook computer, notepad computer, ultra-mobile PC; or game controller, or (ii) a portable electronic device that is configured for communication via a wired or wireless connection with other electronic devices in a network.

"Much smaller" is defined elsewhere in this document.

"Optical distance" means the distance OD specified in the following two sentences. In a medium of constant refractive index, OD=nd, where n is the refractive index and d is the geometric length of the light path. In a medium of varying refractive index, OD=$\int_C$n(s)ds, where C is the light path, s is distance along light path C, and n is local refractive index as a function of distance s. A light path between two points may be bent (e.g., folded), in which case the geometric length of the light path is longer than the straight line physical distance between the two points.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

To say that a subject lens is "present", in the context of a lensometer, means that the subject lens is positioned such that light that travels from a display surface of the lensometer to a camera of the lensometer passes through the subject lens.

As used herein, the term "set" does not include a group with no elements. Mentioning a first set and a second set does not, in and of itself, create any implication regarding whether or not the first and second sets overlap (that is, intersect).

A "single vision lens" means a lens that has a single spherical power, a single cylindrical power, or a combination of a single spherical power and a single cylindrical power.

To say that an aperture is "small" means that the diameter of the aperture 8 mm or less.

"Small aperture camera" means a camera, the aperture of which has a diameter that is less than or equal to 8 mm.

"Small aperture lensometer" means a lensometer that includes a small aperture camera.

"Some" means one or more.

A "spatial light modulator", also called an "SLM", means a device that (i) transmits light through the device or reflects light from the device, and (ii) either (a) attenuates the light, such that the amount of attenuation of a light ray incident at a point on a surface of the device depends on at least the 2D spatial position of the point on the surface; or (b) changes the phase of the light, such that the phase shift of a light ray incident at a point on a surface of the device depends on at least the 2D spatial position of the point on the surface.

"Subject lens" means a lens that is measured by a lensometer.

As used herein, a "subset" of a set consists of less than all of the elements of the set.

"Substantially" means at least ten percent. For example: (a) 112 is substantially larger than 100; and (b) 108 is not substantially larger than 100.

"Such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In some implementations, this invention is a method comprising, in combination: (a) a camera capturing a first image of light, which light leaves a display surface and travels through a subject lens before reaching the camera; and (b) one or more computers performing calculations that are based, at least in part, on the first image and that compute, for each respective region in a set of multiple regions of the subject lens, a refractive attribute of the respective region; wherein (i) the first image is an image of a set of visual features displayed at the display surface, (ii) the camera includes a sensor for measuring intensity of light and also includes a lens system, (iii) the aperture of the camera is small and fixed, and (iv) the small, fixed aperture and the lens system are each located between the subject lens and the sensor. In some cases, the calculations include comparing (i) data derived from the first image and (ii) data derived from a second image captured with the subject lens absent. In some cases, the calculations include: (a) identifying a set of pairs of visual features, which set of pairs is in the first image and is in the second image; and (b) for each respective pair of visual features in the set of pairs, (i) comparing a first orientation and a second orientation, the first orientation being orientation of a line that connects the respective pair of visual features in the first image and the second orientation being orientation of a line that connects the respective pair of visual features in the second image, and (ii) comparing a first distance and a second distance, the first distance being between the respective pair of visual features in the first image and the second distance being between the respective pair of visual features in the second image. In some cases, the calculations include calculating, for each respective feature in the set of visual features: (a) position of more than two points in a perimeter of the respective feature; and (b) a function that fits the more than two points, which function is expressed in polar coordinates and is periodic. In some cases, the calculations include calculating, for each respective feature in the set of visual features, length of the minor and major axes of an elliptical periphery of the respective feature. In some cases, the camera is not focused on the display surface. In some cases, the calculations include calculating a change in shape. In some cases, the diameter of the entrance opening of the camera is greater than or equal to the diameter of each region in the set of regions in the subject lens. In some cases, the camera does not include a telecentric lens system. In some cases, the set of visual features is not created by light passing through holes in a mask. Each of the cases described above in this paragraph is an example of the method described in the first sentence of this paragraph, and is also an example of an embodiment of this invention that may be combined with other embodiments of this invention.

In some implementations, this invention is an apparatus comprising, in combination: (a) a camera for capturing a first image of light that travels from a display surface, through a subject lens and to the camera, the first image being an image of a set of visual features displayed by a display screen; and (b) one or more computers programmed to perform calculations that take the first image as an input and that compute, for each respective region in a set of regions of the subject lens, a refractive attribute of the respective region; wherein (i) the camera includes a sensor for measuring intensity of light, (ii) the camera includes a lens system, (iii) the aperture of the camera is small and fixed, and (iv) the small, fixed aperture and the lens system are each located between the subject lens and the sensor. In some cases, the diameter of the entrance opening of the camera is greater than or equal to the diameter of each region in the set of regions in the subject lens. In some cases, the apparatus includes a mirror that is configured to reflect the light, such that the light reflects off the mirror and travels to the camera. In some cases: (a) the display surface is a display screen; and (b) the camera and display screen are housed in a single mobile device that is part of the apparatus. In some cases, the apparatus is configured to support the subject lens in a position, relative to the camera, display screen and mirror, such that light emitted by the display screen passes through the subject lens twice before reaching the camera. In some cases, the apparatus is configured to support the subject lens in a position, relative to the camera, display screen and mirror, such that light emitted by the display screen passes through the subject lens only once before reaching the camera. In some cases, the calculations include computing translation of a given visual feature, wherein: (a) the translation is between a first position and a second position; (b) the first position is position of the given visual feature in the first image; and (c) the second position is position of the given visual feature in a second image captured with the subject lens absent. In some cases, the calculations include: (a) identifying a set of pairs of visual features, which set of pairs is in the first image and is in a second image captured with the subject lens absent; and (b) for each respective pair of visual features in the set of pairs, (i) comparing a first orientation and a second orientation, the first orientation being orientation of a line that connects the respective pair of visual features in the first image and the second orientation being orientation of a line that connects the respective pair of visual features in the second image, and (ii) comparing a first distance and a second distance, the first distance being between the respective pair of visual features in the first image and the second distance being between the respective pair of visual features in the second image. In some cases, the calculations include calculating, for each respective feature in the set of visual features, length of the minor and major axes of an elliptical periphery of the respective feature. In some cases, the camera does not include a telecentric lens system. Each of the cases described above in this paragraph is an example of the apparatus described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:
1. A method comprising, in combination:
(a) capturing, with a camera, a first image of light, which light leaves a display surface and travels through a subject lens before reaching the camera; and
(b) performing calculations that are based, at least in part, on the first image and that compute, for each specific region in a set of multiple regions of the subject lens, a refractive attribute of the specific region;
wherein
(i) the first image is an image of a set of visual features displayed at the display surface,

(ii) the camera includes a sensor for measuring intensity of light and also includes a lens system,
(iii) the aperture of the camera is fixed and has a diameter that is less than or equal to 8 millimeters,
(iv) the aperture and the lens system are each located between the subject lens and the sensor,
(v) the set of visual features in the first image includes a subset of multiple visual features that are each elliptical and non-circular,
(vi) no visual feature in the subset overlaps with or encloses any other visual feature in the subset, and
(vii) the calculations include calculating, for each specific visual feature in the subset, length of the minor and major axes of an elliptical, non-circular periphery of the specific visual feature.

2. The method of claim 1, wherein the calculations include comparing (i) data derived from the first image and (ii) data derived from a second image captured with the subject lens absent.

3. The method of claim 2, wherein the calculations include:
(a) identifying a pair of visual features, which pair is in the first image and is in the second image;
(b) comparing a first orientation and a second orientation, the first orientation being orientation of a line that connects the pair of visual features in the first image and the second orientation being orientation of a line that connects the pair of visual features in the second image; and
(c) comparing a first distance and a second distance, the first distance being between the pair of visual features in the first image and the second distance being between the pair of visual features in the second image.

4. The method of claim 1, wherein the calculations include calculating, for each specific feature in the set of visual features:
(a) position of more than two points in a perimeter of the specific feature; and
(b) a function that fits the more than two points, which function is expressed in polar coordinates and is periodic.

5. The method of claim 1, wherein the camera is not focused on the display surface.

6. The method of claim 1, wherein the calculations include calculating a change in shape.

7. The method of claim 1, wherein the diameter of the entrance opening of the camera is greater than or equal to the diameter of each region in the set of regions in the subject lens.

8. The method of claim 1, wherein the camera does not include a telecentric lens system.

9. The method of claim 1, wherein the set of visual features is not created by light passing through holes in a mask.

10. Apparatus comprising:
(a) a camera for capturing a first image of light that travels from a display surface, through a subject lens and to the camera, the first image being an image of a set of visual features displayed by a display screen; and
(b) one or more computers programmed to perform calculations that take the first image as an input and that compute, for each respective region in a set of regions of the subject lens, a refractive attribute of the respective region;

wherein
(i) the camera includes a sensor for measuring intensity of light,
(ii) the camera includes a lens system,
(iii) the aperture of the camera is fixed and has a diameter that is less than or equal to 8 millimeters,
(iv) the aperture and the lens system are each located between the subject lens and the sensor,
(v) the set of visual features in the first image includes a subset of multiple visual features that are each elliptical and non-circular;
(vi) no visual feature in the subset overlaps with or encloses any other visual feature in the subset; and
(vii) the calculations include calculating, for each specific visual feature in the subset, length of the minor and major axes of an elliptical, non-circular periphery of the specific visual feature.

11. The apparatus of claim 10, wherein the diameter of the entrance opening of the camera is greater than or equal to the diameter of each region in the set of regions in the subject lens.

12. The apparatus of claim 10, wherein the apparatus includes a mirror that is configured to reflect the light, in such a way that the light reflects off the mirror and travels to the camera.

13. The apparatus of claim 12, wherein:
(a) the display surface is a display screen; and
(b) the camera and display screen are housed in a single mobile device that is part of the apparatus.

14. The apparatus of claim 12, wherein:
(a) the subject lens is not a lens of a human eye; and
(b) the apparatus is configured to support the subject lens in a position, relative to the camera, display screen and mirror, in such a way that light emitted by the display screen passes through the subject lens twice before reaching the camera.

15. The apparatus of claim 12, wherein
(a) the subject lens is not a lens of a human eye; and
(b) the apparatus is configured to support the subject lens in a position, relative to the camera, display screen and mirror, in such a way that light emitted by the display screen
(i) passes through the subject lens only once before reaching the camera, and
(ii) reflects from the mirror before reaching the camera and before or after passing through the subject lens.

16. The apparatus of claim 10, wherein the calculations include computing translation of a given visual feature, wherein:
(a) the translation is between a first position and a second position;
(b) the first position is position of the given visual feature in the first image; and
(c) the second position is position of the given visual feature in a second image captured with the subject lens absent.

17. The apparatus of claim 10, wherein the calculations include:
(a) identifying a pair of visual features, which pair is in the first image and is in the second image;
(b) comparing a first orientation and a second orientation, the first orientation being orientation of a line that connects the pair of visual features in the first image and the second orientation being orientation of a line that connects the pair of visual features in the second image; and (c) comparing a first distance and a second distance, the first distance being between the pair of visual features in the first image and the second distance being between the pair of visual features in the second image.

18. The apparatus of claim 10, wherein the camera does not include a telecentric lens system.

* * * * *